(12) United States Patent
Narita

(10) Patent No.: US 11,989,313 B2
(45) Date of Patent: May 21, 2024

(54) PRINTING APPARATUS, METHOD FOR CONTROLLING PRINTING APPARATUS, AND STORAGE MEDIUM

(71) Applicant: CANON KABUSHIKI KAISHA, Tokyo (JP)

(72) Inventor: Yuki Narita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 17/677,852

(22) Filed: Feb. 22, 2022

(65) Prior Publication Data

US 2022/0277090 A1   Sep. 1, 2022

(30) Foreign Application Priority Data

Feb. 26, 2021   (JP) ................................. 2021-030080

(51) Int. Cl.
*G06F 21/60* (2013.01)
*G06F 21/33* (2013.01)
*G06F 21/34* (2013.01)
*G06F 21/40* (2013.01)
*G06F 21/10* (2013.01)

(52) U.S. Cl.
CPC ............ *G06F 21/608* (2013.01); *G06F 21/33* (2013.01); *G06F 21/34* (2013.01); *G06F 21/40* (2013.01); *G06F 21/1014* (2023.08); *G06F 2221/2141* (2013.01)

(58) Field of Classification Search
None
See application file for complete search history.

(56) References Cited

U.S. PATENT DOCUMENTS

| 8,613,063 B2* | 12/2013 | Nishida ................... G06F 21/31 |
| | | 358/1.14 |
| 2006/0256370 A1* | 11/2006 | Murakawa .............. H04L 63/08 |
| | | 358/1.14 |
| 2021/0029546 A1* | 1/2021 | Maufort ................ G06F 21/608 |

FOREIGN PATENT DOCUMENTS

JP   2019155610 A   9/2019

* cited by examiner

*Primary Examiner* — Nelson S. Giddins
(74) *Attorney, Agent, or Firm* — Canon U.S.A., Inc. IP Division

(57) ABSTRACT

An image forming apparatus including a function including at least a print function includes a first authentication unit configured to perform authentication processing on local access to the image forming apparatus, a second authentication unit configured to perform authentication processing on remote access to the image forming apparatus, and a reception unit configured to receive separately a setting to activate multi-factor authentication processing including a plurality of authentication factors in the authentication of the local access and a setting to activate multi-factor authentication processing including a plurality of authentication factors in the authentication of the remote access. In a case where the multi-factor authentication processing for the local access is activated and the multi-factor authentication processing for the remote access is not activated, the activated multi-factor authentication processing for the local access is controlled not to be deactivated from the authenticated remote access.

10 Claims, 8 Drawing Sheets

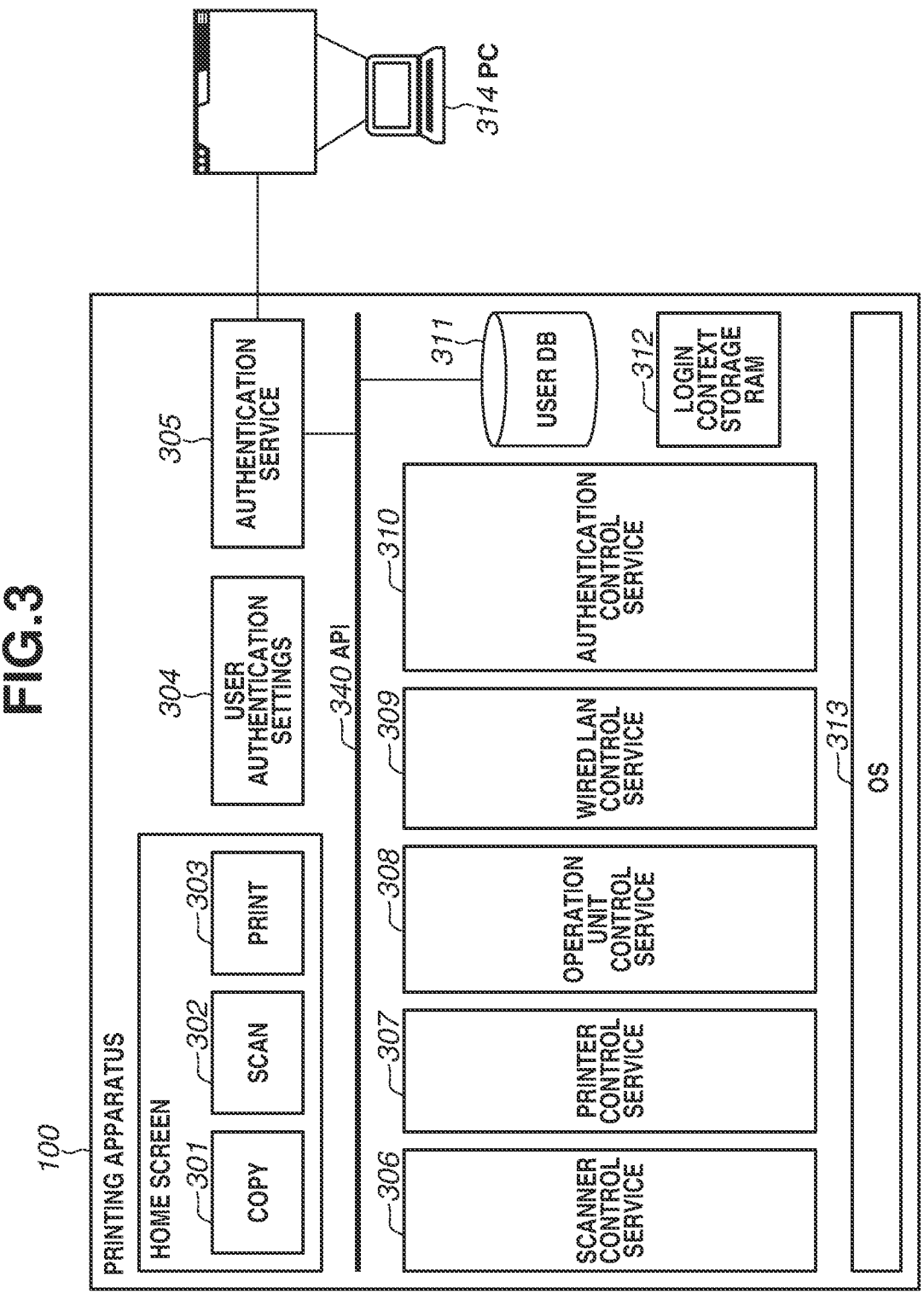

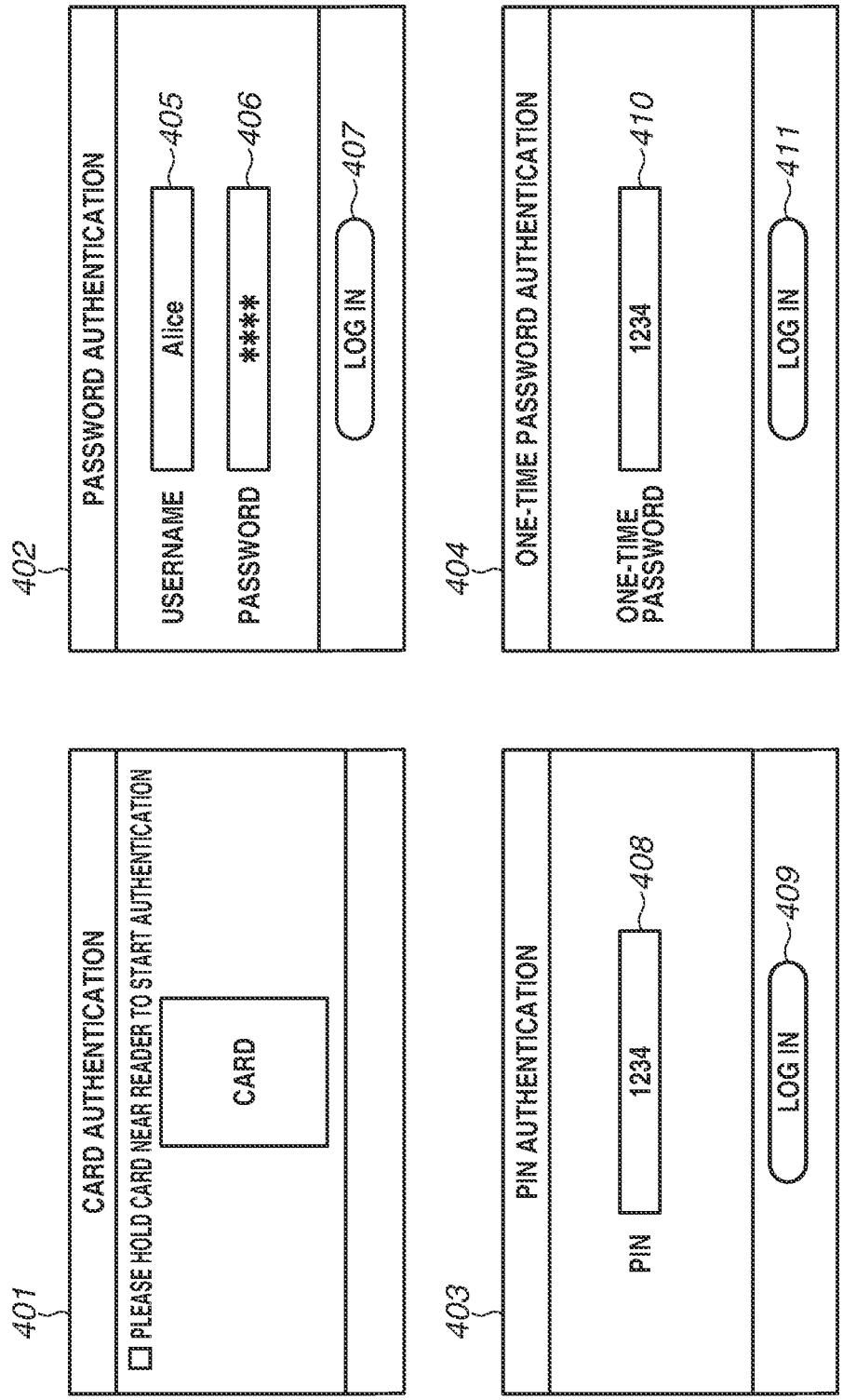

FIG.5A

501 — AUTHENTICATION SETTING SCREEN (MULTI-FACTOR AUTHENTICATION SETTING)

503 — MULTI-FACTOR AUTHENTICATION SETTING:
- ■ ALL USERS
- ☐ ADMINISTRATOR ONLY
- ☐ OFF

504 — AUTHENTICATION TO USE IN MULTI-FACTOR AUTHENTICATION

FIRST FACTOR
- ■ IC CARD AUTHENTICATION
- ☐ FACE AUTHENTICATION

SECOND FACTOR
- ☐ PASSWORD AUTHENTICATION
- ■ PIN

505 — MULTI-FACTOR AUTHENTICATION SETTING OF REMOTE UI AUTHENTICATION
- ☐ ALL USERS
- ☐ ADMINISTRATOR ONLY
- ■ OFF

506 — MULTI-FACTOR AUTHENTICATION TO USE IN REMOTE UI AUTHENTICATION

FIRST FACTOR
- ■ PASSWORD AUTHENTICATION

SECOND FACTOR
- ☐ ONE-TIME PASSWORD

FIG.5B

502 — AUTHENTICATION SETTING SCREEN (USER SETTING)

507 — ☐ EDIT AUTHENTICATED USER SETTINGS
- USER PASSWORD ****
- PIN ****
- EMAIL ADDRESS Alice@domain.net

508 — ☐ CHANGE AUTHENTICATION INFORMATION ABOUT OTHER USERS
- ☐ BoB
- ☐ Carol
- ☐ Deive
- :

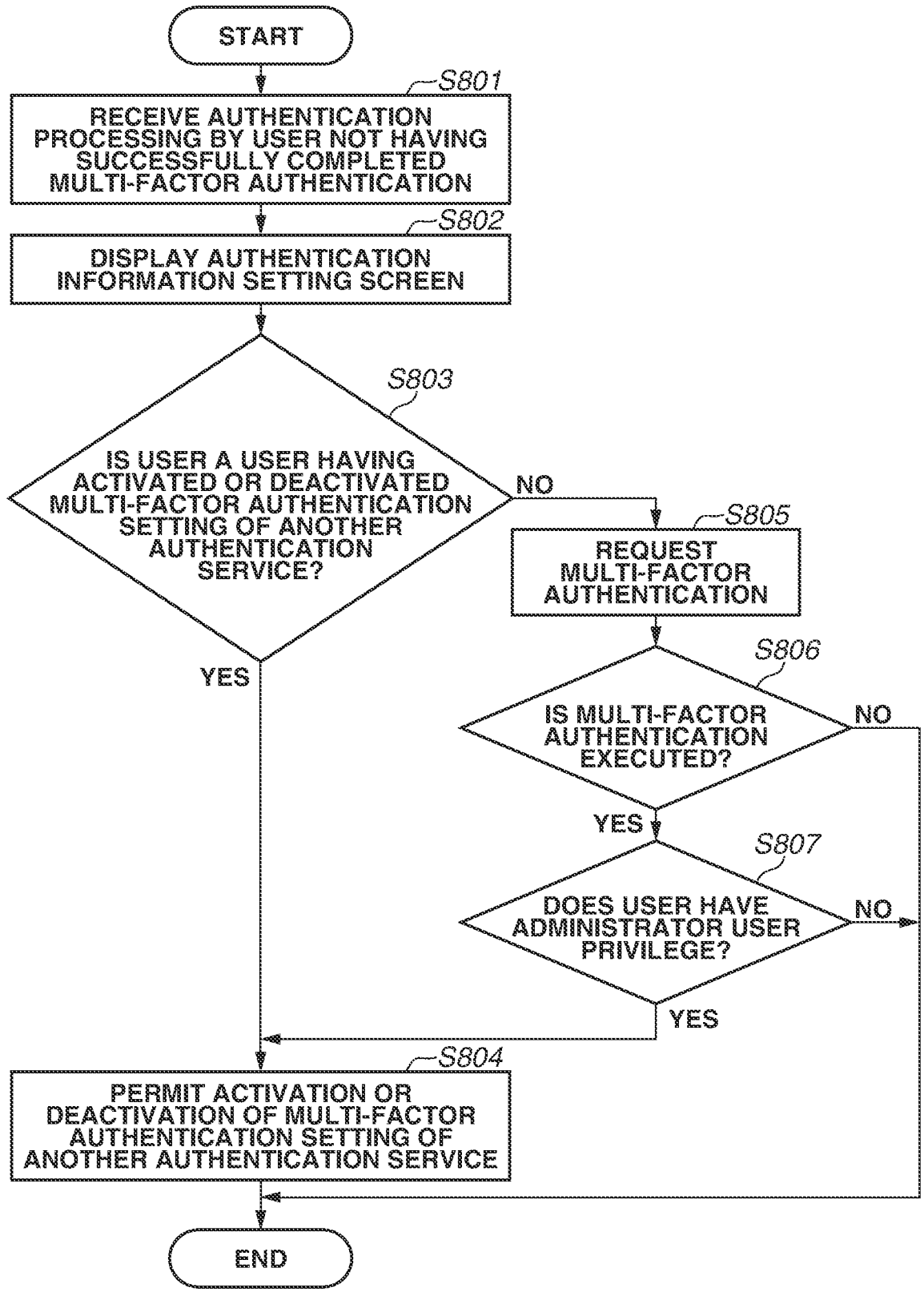

PRINTING APPARATUS, METHOD FOR CONTROLLING PRINTING APPARATUS, AND STORAGE MEDIUM

BACKGROUND

Field of the Disclosure

The present disclosure relates to a printing apparatus including a multi-factor authentication function, a method for controlling the printing apparatus, and a storage medium.

Description of the Related Art

Cyberattacks are becoming sophisticated in recent years, and multi-factor authentication has been introduced against the sophisticated cyberattacks. Multi-factor authentication has three factors: "knowledge information", "possession information", and "biometric information". The "knowledge information" refers to information that the user alone knows, such as a password or personal identification number (PIN). The "possession information" refers to something that the user alone possesses, such as an integrated circuit (IC) card or a hardware token (one-time password). The "biometric information" is biologically inherent information/characteristic that the user has, such as fingerprint, vein, or face. Use of multi-factor authentication using a combination of "knowledge information", "possession information", and "biometric information" provides protection against cyberattacks and reduces a risk of improper use of the system.

User authentication using an IC card issued as an employee identification card is provided as a method of user authentication in using the operation panel of a printing apparatus installed in an office. Since user authentication is executed simply by holding the IC card near the reader, the method is highly convenient and is widely used.

Further, there are some printing apparatuses that provide a method of multi-factor authentication using a combination of an IC card as "possession information" and a PIN as "knowledge information". Further, other printing apparatuses provide a method of multi-factor authentication using a combination of a plurality of authentication factors such as an IC card as "possession information" and biometric authentication (refer to Japanese Patent Application Laid-Open No. 2019-155610).

Further, these printing apparatuses typically include a webserver function that enables access via a web browser of a personal computer (PC) terminal. Thus, users can remotely access a printing apparatus using a web browser of a PC terminal and operate a HyperText Markup Language (HTML) user interface. Hereinafter, the HTML user interface will be referred to as "remote UI". In general, "knowledge information" such as ID and password is used to authenticate a user of the remote UI of a printing apparatus.

The multi-factor authentication method can be provided to a remote access user. However, in a case where multi-factor authentication for use in an operation panel and multi-factor authentication for use in remote access are performed in different manners, activation or deactivation of multi-factor authentications might be performed for each authentication service. Thus, there is a security risk that an attacker can access the printing apparatus without performing a multi-factor authentication by the multi-factor authentication of another authentication service being deactivated by the authentication service that multi-factor authentication is not activated.

SUMMARY

Embodiments of the present disclosure are based on the above-described issues. A system for prohibiting a change of a multi-factor authentication setting of another authentication service from an authentication service that does not perform multi-factor authentication is provided to an image forming apparatus providing multi-factor authentication using at least one different authentication factor for each of a plurality of access methods. Embodiments of the present disclosure are directed to providing this system that enables a printing apparatus including a multi-factor authentication method to prevent an unauthorized login of an attacker incapable of responding to the multi-factor authentication and reduce the security risks.

According to embodiments of the present disclosure, an image forming apparatus including a function including at least a print function includes a first authentication unit configured to perform authentication processing on local access to the image forming apparatus, a second authentication unit configured to perform authentication processing on remote access to the image forming apparatus, and a reception unit configured to receive separately a setting to activate multi-factor authentication processing including a plurality of authentication factors in the authentication of the local access and a setting to activate multi-factor authentication processing including a plurality of authentication factors in the authentication of the remote access. In a case where the multi-factor authentication processing for the local access is activated and the multi-factor authentication processing for the remote access is not activated, the activated multi-factor authentication processing for the local access is controlled not to be deactivated from the authenticated remote access.

Further features of the present disclosure will become apparent from the following description of exemplary embodiments with reference to the attached drawings.

BRIEF DESCRIPTION OF THE DRAWINGS

FIG. 3 is a diagram illustrating a software configuration and a data area managed by the software.

FIG. 4 illustrates an example of authentication screens provided by a printing apparatus.

FIGS. 5A and 5B are diagrams illustrating authentication setting screens provided by the printing apparatus.

FIG. 8 is a flowchart illustrating a multi-factor authentication setting activation process.

DESCRIPTION OF THE EMBODIMENTS

Some exemplary embodiments of the present disclosure will be described below with reference to the drawings and a table.

Figure 1:
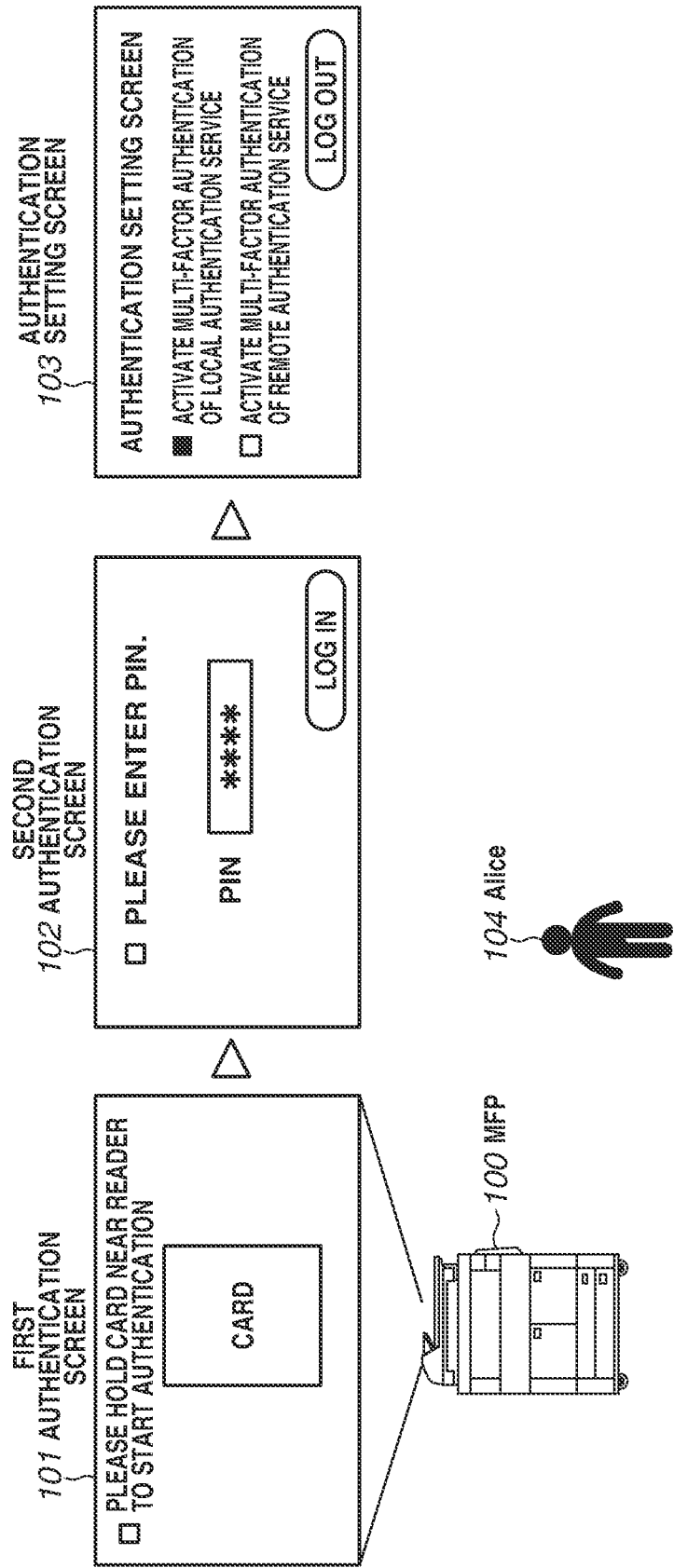
FIG. 1 is a diagram illustrating a system configuration.

A first exemplary embodiment will be described. FIG. 1 is a simplified diagram illustrating a configuration of a system to which the present exemplary embodiment is applied, and a multi-function peripheral (MFP) 100 is a printing apparatus that performs authentication processing. A first authentication screen 101 is a screen via which integrated circuit (IC) card authentication for use in multi-factor authentication is executed. A second authentication screen 102 is a screen via which a personal identification number (PIN) for use in multi-factor authentication is input. An authentication setting screen 103 is a screen via which whether to activate multi-factor authentication processing is set for each type of access. A user Alice 104 is a user registered in a user database.

The user Alice 104 executes IC card authentication and thereafter inputs a PIN for authentication by the printing apparatus 100. Further, the user Alice 104 after successfully authenticated can change a setting screen of the printing apparatus 100 to the authentication setting screen 103 to select whether to activate or deactivate the multi-factor authentication of a local authentication service and whether to activate or deactivate the multi-factor authentication of a remote authentication service. The multi-factor authentication processing activation settings for the local authentication service and the remote authentication service are separately received considering a difference between authentication factors of multi-factor authentication processing. The present specification describes an example where a user authenticated successfully by the local authentication service is prohibited from changing the multi-factor authentication of the remote authentication service from local access. Similarly, a user authenticated successfully by the remote authentication service can be prohibited from changing the multi-factor authentication of the local authentication service from remote access.

The printing apparatus 100 including an image forming function defined herein includes at least a printer that serves as a print function. In another case, the printing apparatus 100 has a copy function and a scan function and further has a function of allowing IC card registration and password/PIN editing via the authentication setting screen 103.

Figure 2:
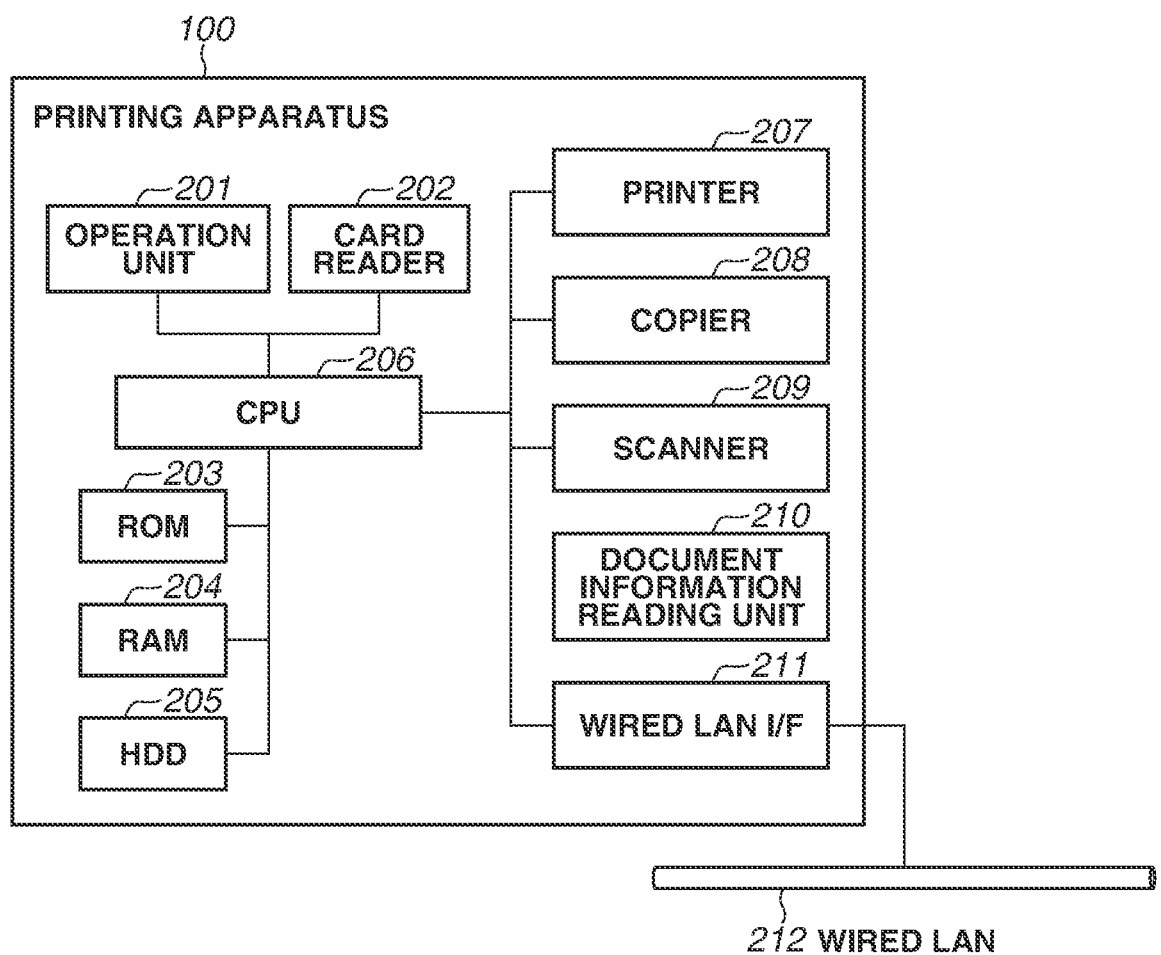
FIG. 2 is a diagram illustrating a hardware configuration.

FIG. 2 is a diagram illustrating a hardware configuration of the printing apparatus 100 according to the present exemplary embodiment. The printing apparatus 100 includes a document information reading unit 210 in addition to a printer 207, a copier 208, and a scanner 209. The document information reading unit 210 reads scanned document information. The printing apparatus 100 further includes an operation unit 201, a card reader 202, and a central processing unit (CPU) 206. The operation unit 201 is operated to operate the MFP 100. A card is held near the card reader 202 to log in. The CPU 206 controls the foregoing components.

The printer 207 is a unit that carries out a reception function. For example, the printer 207 forms an image based on a print job received from a personal computer (PC) connected to a wired local area network (wired LAN) 212 on the same network and outputs the formed image on a sheet. The copier 208 and the scanner 209 are units that carry out a transmission function. The copier 208 and the scanner 209 optically read an image of a document set on a scanner section and output the read image as image data to a sheet.

The document information reading unit 210 reads information (barcode, Quick Response (QR) Code®, watermark) embedded in a document scanned by the scanner 209 and stores the read information in a hard disk drive (HDD) 205.

The CPU 206 dynamically controls the hardware components 201, 202, and 206 to 211 of the MFP 100 to carry out the functions of the MFP 100. The CPU 206 transmits signals to the hardware components via a bus line and performs data communication with the other hardware components. The operation unit 201 is a user interface via which a user of the printing apparatus 100 uses the printer 207, the copier 208, and the scanner 209. Further, the operation unit 201 is operable as a touch panel. The card reader 202 is a unit that performs authentication using a card.

Next, a software configuration according to the present exemplary embodiment will be described below with reference to FIG. 3. FIG. 3 is a diagram illustrating a software configuration of the printing apparatus 100. The printing apparatus 100 in FIG. 3 includes a copy 301, a scan 302, a print 303, user authentication settings 304, and an authentication service 305 as applications that operate on a platform. Further, the above-described applications communicate with various control services via an application program interface (API) 340 to activate applications. The various control services are a module group including a scanner control service 306, a printer control service 307, an operation unit control service 308, a wired LAN control service 309, and an authentication control service 310. The printing apparatus 100 further includes a user database (user DB) 311 and a login context storage random access memory (login context storage RAM) 312. The user DB 311 stores user information, and the login context storage RAM 312 stores a login context of a user that has logged in.

The copy 301, the scan 302, the print 303, the user authentication settings 304, and the authentication service 305 provide a user interface that a user can operate. The authentication service 305 provides the local authentication service function and the remote authentication service function for login to the printing apparatus 100. The local authentication service authenticates local access by a user via the operation unit 201 and/or the card reader 202. The local authentication service is a service that performs authentication processing in operating the MFP 100 and making the settings of the MFP 100 from a local user interface (local UI) displayed on the operation unit control service 308 and provides a local UI authentication screen to prompt the user to input authentication information.

The remote authentication service authenticates remote access by a user via a web browser of a PC 314. The remote authentication service has a Hypertext Transfer Protocol (HTTP) server function. The remote authentication service provides a HyperText Markup Language (HTML) user interface to the remote access user. The user accesses a remote user interface (remote UI) using the web browser of the PC 314 to change the settings of the MFP 100 and use the functions of the MFP 100. Further, a new user is registered and user information is changed using the information in the user DB 311, which manages login users.

The functions according to the above-described exemplary embodiment are carried out by programs described in a legacy programming language or an object-oriented programming language such as an assembly language, C, C++, Visual C++, Perl, Ruby, or Java®.

An authentication method used in the authentication service 305 will be described. Further, as an authentication database is the user DB 311 according to the first exemplary embodiment, registered data and reference data refer to the user DB 311.

A card authentication service is one of the local authentication services that performs authentication by a user's touching the card reader 202 of the printing apparatus 100 and provides a screen 401 illustrated in FIG. 4. The remote authentication service does not include the card authentication service. The card authentication service cannot thus be set as an authentication factor of multi-factor authentication of the remote authentication service.

A user brings a card of the user into contact with the card reader 202 of the printing apparatus 100. After receiving the processing, the printing apparatus 100 reads a read card ID from the card reader 202. The printing apparatus 100 transmits an inquiry about the acquired card ID to the authentication database to search for a card ID associated with the user account. In a case where a search result indicates that the card information is registered, the printing apparatus 100 performs authentication processing using the registered user account. In a case where the card ID is not registered, the printing apparatus 100 determines that an authentication error occurs to display a card authentication screen.

Further, card information is registered in the authentication database in using the card authentication service. In registering a card, a user inputs the user account and password to the printing apparatus 100 and performs user confirmation processing. A database similar to the authentication database is used as a method for the confirmation, and in a case where the user account is not registered in the authentication database, a user confirmation error occurs.

After performing the user confirmation, the user brings a card to be registered into contact with the card reader 202, which associates the user account and the card ID with each other, allowing the user to conduct the card authentication service.

A user account authentication service refers to an authentication service (user account authentication 402 in FIG. 4), which prompts a user to input a user account and a password in authentication of local access to the local UI of the printing apparatus 100 and authentication of remote access to the remote UI from the PC 314 or a mobile terminal to allow the user to log into the printing apparatus 100. The local authentication service and the remote authentication service both include the user account authentication service.

A user to use the printing apparatus 100 inputs a user account to a text field 405 and a password to a text field 406 displayed on a local panel and presses a login button 407. At this time, in a case where the user account and password information is registered in the authentication database, a post-authentication screen is displayed. In a case where the user account does not exist or the input password does not match, it is determined that an authentication error occurs, and a user account authentication screen is displayed.

In using the user account authentication service, the authentication information is registered in the authentication database. This registration processing is expected to be performed by an administrator user granted an administrator privilege.

A PIN authentication service refers to an authentication service (PIN authentication 403 in FIG. 4) that prompts a user to input a PIN in authentication to the local UI of the printing apparatus 100 and authentication to the remote UI from the PC 314 or a mobile terminal to allow the user to log into the printing apparatus 100. The local authentication service and the remote authentication service both include the PIN authentication service.

An authentication procedure and the user registration processing are similar to those of the user account authentication service. It is assumed that the PIN authentication service is used together with the IC card authentication and the user account authentication in the present specification. Thus, the user is requested to input the PIN after the IC card authentication and the user account authentication are successfully performed in a case where the multi-factor authentication is set.

Software token authentication for use in the present exemplary embodiment will be described. The software token authentication for use in the present exemplary embodiment is a one-time password method and can use a time-based one-time password (TOTP) defined in the Request for Comments (RFC) 6238. In this method, a one-time password is generated using a secret generated for each user and time. The secret is a random number. Mobile applications (applications for smartphones) that support TOTP are widely used in recent years. The secret is stored in a TOTP-support mobile application by registering the secret as a character string in the mobile application or by reading a QR code containing the secret information using the mobile application of a mobile terminal.

This allows the secret to be shared by the secret issuer and the mobile application installed in the mobile terminal. The TOTP-support mobile application generates a one-time password based on the secret and time. Besides the TOTP-support mobile applications, there are plug-ins that support TOTP and are installable as an extended function of the web browser of the PC 314. According to the present exemplary embodiment, the secret issuer is the authentication service 305, and in a case where the one-time password authentication is set as one of the authentication factors, the secret is provided to the mobile application using a method as described above. Each user of the printing apparatus 100 uses the TOTP-support mobile application or the TOTP-support plug-in of the web browser. A one-time password generated using software such as a mobile application or a plug-in of a web browser is generally referred to as a software token.

While the one-time password authentication is described as an authentication service that the remote authentication service alone includes as illustrated in FIGS. 5A and 5B according to the present exemplary embodiment, the one-time password authentication can be provided as a local authentication service.

Table 1 below shows the user information registered in the authentication database defined in the present specification.

TABLE 1

| User Information Registered in Database | | | | | | |
|---|---|---|---|---|---|---|
| Username | Card ID | PIN | Password | TOTP Secret | Privilege to Use Printing Apparatus | Multi-factor Authentication is Successfully Completed |
| Alice | 44E7158e . . . | 1234 | ******** | ghut5oasg . . . | Administrator | TRUE |
| Bob | 045BB438 . . . | 5678 | ******** | 898jfjad9fh . . . | General | FALSE |

The user account and the password in Table 1 are referred to in performing the authentication processing of the user account authentication service and the registration processing of the card authentication service. The card ID is referred to in performing the authentication processing of the card authentication service. The TOTP is information for use in performing the one-time password authentication after the user account authentication is performed in a case where the multi-factor authentication setting of the remote UI authentication is set, and a unique value is registered for each user. The privilege to use printing apparatus is referred to in displaying information settable in user authentication information settings. A flag indicating whether the multi-factor authentication is successfully performed is used in determining whether to allow activation or deactivation of the multi-factor authentication function from another authentication service.

The following is a description of a combination of authentication processing methods for use in multi-factor authentication in the local authentication service and the remote authentication service of the printing apparatus 100. The multi-factor authentication in the local authentication is performed using first and second authentication factors. The first authentication factor is the IC card authentication 401 corresponding to possession information, and the second authentication factor is the PIN authentication 403 corresponding to knowledge information. While the present specification describes the multi-factor authentication for use in the local authentication using a combination of the IC card and the PIN, a combination of the IC card and the user account authentication 402 corresponding to knowledge information can be employed.

The multi-factor authentication in the remote authentication is performed using first and second authentication factors. The first authentication factor is the user account authentication 402 corresponding to knowledge information, and the second authentication factor is one-time password authentication (one-time password authentication 404 in FIG. 4) corresponding to possession information. In some embodiments, the multi-factor authentication is performed using a combination including face authentication or iris authentication corresponding to biometric information.

FIGS. 5A and 5B illustrate an authentication setting screen of the printing apparatus 100. The authentication setting screen includes an authentication setting screen 501 and a setting screen 502. The authentication setting screen 501 relates to the multi-factor authentication for use in the authentication services, and the setting screen 502 relates to the user information such as the password and PIN for use in user authentication.

A "multi-factor authentication setting" 503 is a setting to select whether to activate or deactivate the multi-factor authentication in the authentication service being used, and a multi-factor authentication target can be selected from "all users" and "administrator only". In a case where "all users" is selected, the multi-factor authentication processing is performed in authenticating each user registered in the database to which the printing apparatus 100 refers. In a case where "administrator only" is selected, the printing apparatus 100 checks the privilege information about the user at the time of performing the first-factor authentication. In a case where the user is an administrator user, the printing apparatus 100 performs the multi-factor authentication processing, whereas in a case where the user is a general user, the printing apparatus 100 does not request the multi-factor authentication and allows access in the first-factor authentication processing. An "authentication to use in multi-factor authentication" setting 504 is a setting to select authentication factors to use. A combination that does not constitute multi-factor authentication is not selectable.

A "multi-factor authentication setting of remote UI authentication" setting 505 is a setting to activate or deactivate the multi-factor authentication of another authentication service. According to the present exemplary embodiment, the local authentication service performs the authentication and displays the authentication setting screen, and the setting is displayed as "multi-factor authentication setting of remote UI authentication". In a case where the remote authentication service is performed and the authentication setting screen is displayed, the setting is displayed as "multi-factor authentication setting of local authentication". A feature of embodiments of the present disclosure is to control the activation of the multi-factor authentication setting.

A "multi-factor authentication to use in remote UI authentication" setting 506 is a setting to select authentication factors to use in the multi-factor authentication, as in the "authentication to use in multi-factor authentication" setting 504. Next, the authentication setting screen via which the user settings can be made will be described. An "edit authenticated user settings" setting 507 is a screen via which the authentication information settings of the user currently logged in to the printing apparatus 100 can be changed. Further, the information is settings that can be edited by any users having the administrator user privilege or the general user privilege. A "change authentication information about other users" setting 508 is a screen via which information about the users other than the currently-authenticated user can be changed. This setting can be changed by an administrator, and the email addresses, passwords, and PINS of the other users can be changed.

Figure 6:
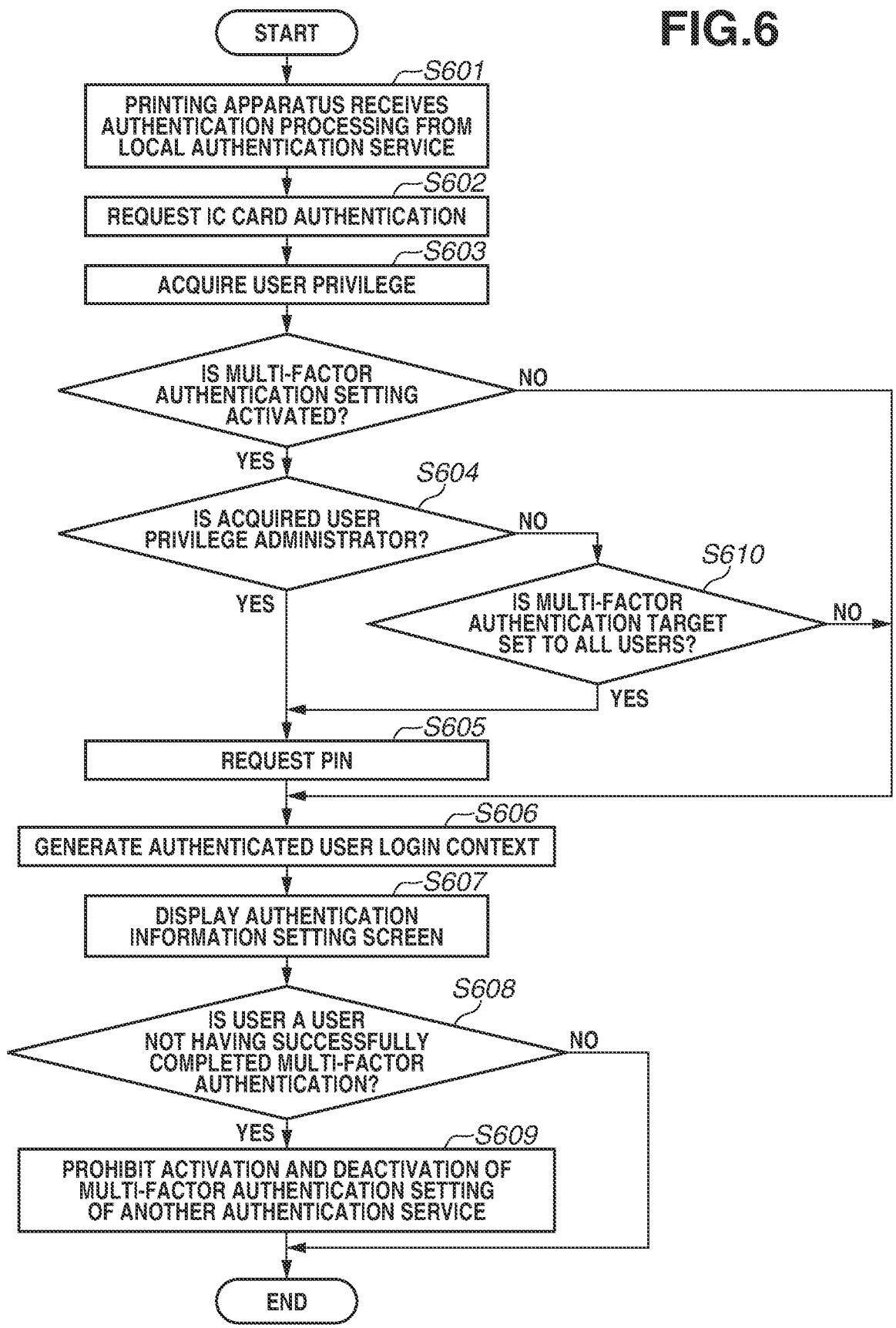
FIG. 6 is a flowchart illustrating a process of prohibiting a change of a multi-factor authentication setting of another authentication service.

Next, a flowchart in FIG. 6 will be described. The flowchart illustrates a case where the authentication processing is performed from the local authentication service and changing the multi-factor authentication setting of another authentication service is prohibited in a case where the multi-factor authentication is not performed.

<Process of Prohibiting Change of Multi-Factor Authentication Setting of Another Authentication Service>

In step S601, the printing apparatus 100 receives the authentication processing from the authentication screen for the authentication by the local authentication service. In step S602, the printing apparatus 100 requests the IC card authentication. Thereafter, the printing apparatus 100 performs the authentication processing based on the IC card information. In a case where the IC card information is registered in the database to which the printing apparatus 100 refers, the authentication is allowed, and in step S603, the printing apparatus 100 acquires the user privilege information about the authenticated user.

After the authentication processing is performed, the printing apparatus 100 refers to the information set via the authentication setting screen 501 to check whether the multi-factor authentication is activated. In a case where the multi-factor authentication is not set, the processing proceeds to step S606. In step S606, the printing apparatus 100 generates a login context of the authenticated user.

On the other hand, in a case where the multi-factor authentication is set, the processing proceeds to step S604. In step S604, the printing apparatus 100 refers to the user privilege information acquired in step S603. In a case where the privilege information indicates an administrator (YES in step S604), the processing proceeds to step S605. In step S605, the printing apparatus 100 requests the second-factor authentication. On the other hand, in a case where the privilege information does not indicate an administrator (NO in step S604), the processing proceeds to step S610. In step S610, the printing apparatus 100 checks the authentication setting screen 501 to check the multi-factor authentication target user. In a case where the multi-factor authentication target user is "all users" as the result of the checking (YES in step S610), the processing proceeds to step S605. In step S605, the printing apparatus 100 requests the second-factor authentication as in the case of the user having the administrator privilege. On the other hand, in a case where the multi-factor authentication target user is "administrator only" (NO in step S610), the processing proceeds to step S606. In step S606, as a general user is not a multi-factor authentication target user, the printing apparatus 100 generates a login context of the authenticated user.

After the login context generation processing ends, in step S607, the user moves to the authentication setting screen 501, and in step S608, the printing apparatus 100 determines whether the currently-authenticated user is a user not having successfully completed the multi-factor authentication. In a case where the currently-authenticated user is a user not having successfully completed the multi-factor authentication (YES in step S608), the processing proceeds to step S609. In step S609, activation and deactivation of the multi-factor authentication setting of another authentication service displayed on the authentication setting screen 501 are prohibited. In the case in FIG. 6, activation and deactivation of the multi-factor authentication setting of the remote UI authentication are prohibited. On the other hand, in a case where the currently-authenticated user is a user having successfully completed the multi-factor authentication (NO in step S608), activation and deactivation of the multi-factor authentication setting of another authentication service displayed on the authentication setting screen 501 are allowed, and the process ends.

<Process of Setting Multi-Factor Authentication Information>

Figure 7:
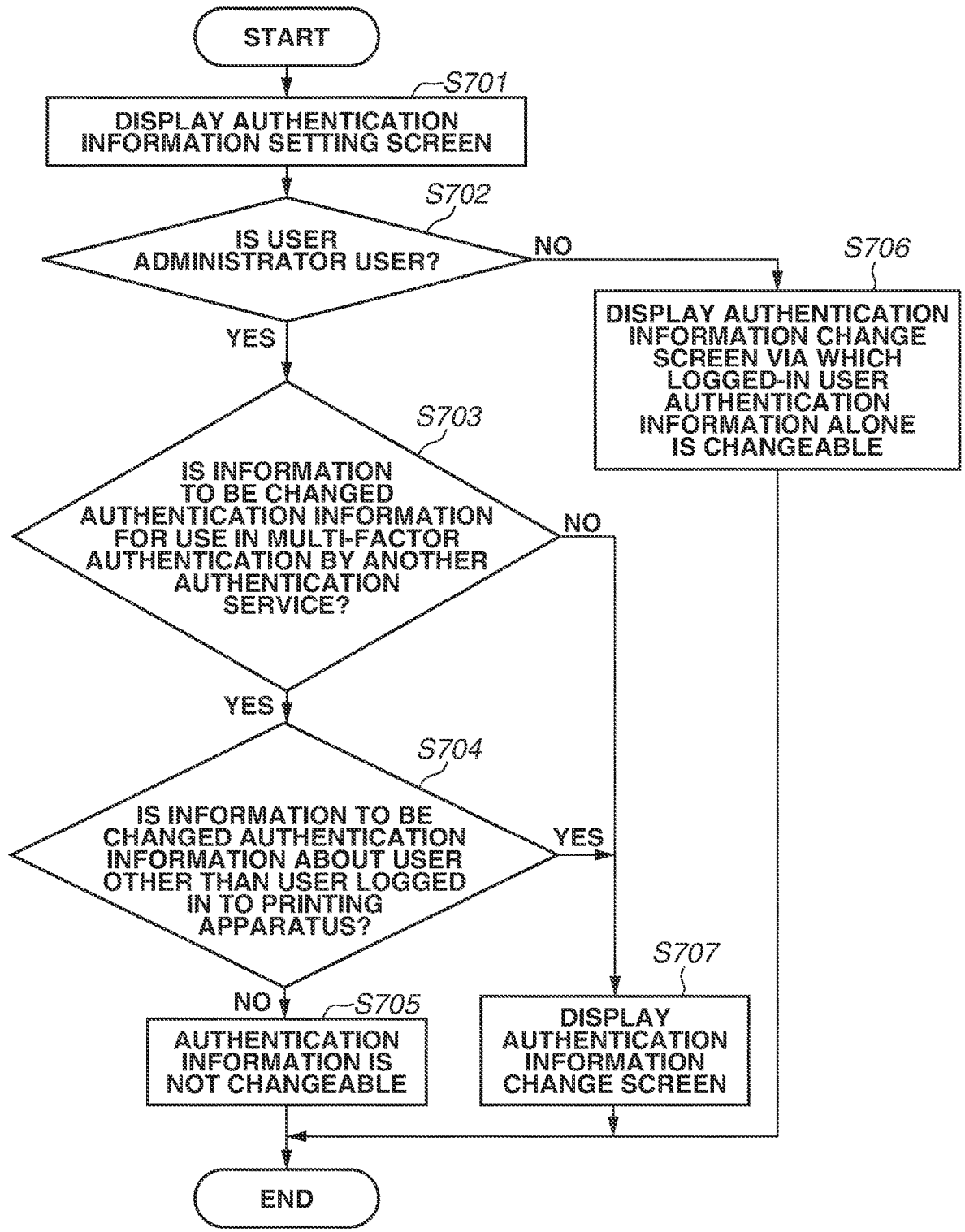
FIG. 7 is a flowchart illustrating a multi-factor authentication setting process.

FIG. 7 illustrates a setting process in performing the multi-factor authentication setting. In step S701, the printing apparatus 100 displays the authentication setting screen 501. In step S702, after displaying the authentication setting screen 501, the printing apparatus 100 acquires the privilege information about the user being authenticated from the login context. In a case where the acquisition result indicates that the user is a user other than an administrator user (NO in step S702), the processing proceeds to step S706. In step S706, an authentication information change setting screen via which the information alone about the user logged in to the printing apparatus 100 is changeable is displayed. On the other hand, in a case where the acquisition result indicates that the user is an administrator user (YES in step S702), an authentication information setting screen via which the multi-factor authentication setting and the user information setting are selectable is displayed. The processing proceeds to step S703.

In step S703, in a case where an authentication setting information change request from the administrator user is received to change the authentication information for use in the multi-factor authentication by another authentication service (YES in step S703), the processing proceeds to step S704. In step S704, whether the authentication information is authentication information about a user other than the user logged in to the printing apparatus 100 is checked. In a case where the authentication information about another user is to be changed (YES in step S704), the processing proceeds to step S707. In step S707, the printing apparatus 100 allows the user to change information other than the user information for use in the multi-factor authentication by another service via an authentication information change screen.

That configuration allows activation or deactivation of the multi-factor authentication setting set in an authentication service from another service to be prohibited. For example, in a case where the local authentication service is not to perform the multi-factor authentication with the multi-factor authentication of the remote authentication service set, changing the multi-factor authentication setting of the remote authentication service from the local authentication service is prohibited. This reduces security risks that the multi-factor authentication setting is deactivated from another authentication service, the authentication setting is changed to single-factor authentication, and then the authentication is performed.

A second exemplary embodiment will be described. FIG. 8 illustrates a setting activation process that allows activation of the multi-factor authentication setting of another authentication service in a case where a specific condition is satisfied in the process of prohibiting a change of the multi-factor authentication setting of another authentication service. In step S801, the authentication service receives the authentication processing by a user not having successfully completed the multi-factor authentication. In step S802, the authentication information setting screen is displayed.

In step S803, in activating or deactivating the multi-factor authentication setting of another authentication service via the authentication information setting screen, the printing apparatus 100 determines whether the user is a user having activated or deactivated the multi-factor authentication setting of another authentication service based on the login context information about the user being authenticated.

The login context is generated based on the "user information registered in database" in Table 1 and contains the username, the privilege to use the printing apparatus 100, and information about whether the user has successfully completed the multi-factor authentication. The flag indicating that the multi-factor authentication is successfully completed has different flags for the local authentication service and the remote authentication service, and the flag is changed to "TRUE" at a timing when the multi-factor authentication is activated or deactivated. A timing when the flag is initialized is a timing when the multi-factor authentication setting is changed by another user. The flag is also initialized at a timing when the database or device setting is initialized. By checking the status of the flag, the printing apparatus 100 determines whether the user is a user having activated or deactivated the multi-factor authentication setting.

In a case where the user is a user having activated or deactivated the multi-factor authentication setting from another authentication service (YES in step S803), the processing proceeds to step S804. In step S804, the printing apparatus 100 allows the user to activate or deactivate the multi-factor authentication setting of another authentication service via the authentication information setting screen. On the other hand, in a case where the user is not a user having activated or deactivated the multi-factor authentication setting from another authentication service (NO in step S803), the processing proceeds to step S805. In step S805, the printing apparatus 100 requests the multi-factor authentication.

For example, in an environment where the multi-factor authentication is not activated on the local and remote sides, an administrator user A logs in using the local authentication service and thereafter activates the local multi-factor authentication setting. Thereafter, in a case where an administrator user B wishes to deactivate the local multi-factor authentication setting from the remote authentication service, the change is not allowed according to the first exemplary embodiment. On the other hand, according to the second exemplary embodiment, in step S807, the printing apparatus 100 requests the remote multi-factor authentication processing and determines that the user is an administrator user and can perform the multi-factor authentication (YES in step S807), and the processing proceeds to step S804. In step S804, the printing apparatus 100 allows the user to activate or deactivate another authentication service. In a case where the multi-factor authentication cannot be performed or the multi-factor authentication is performed by a user different from the currently-logged-in user, activation or deactivation of the multi-factor authentication setting is prohibited as in step S609, and the process ends.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030080, filed Feb. 26, 2021, which is hereby incorporated by reference herein in its entirety.

What is claimed is:

1. An image forming apparatus including a function including at least a print function, the image forming apparatus comprising:
one or more processors; and
at least one memory coupled to the one or more processors and storing instructions, which when executed by the one or more processors, cause the image forming apparatus to:
perform authentication processing on local access to the image forming apparatus;
perform authentication processing on remote access to the image forming apparatus; and
receive separately a setting to activate multi-factor authentication processing including a plurality of authentication factors in the authentication of the local access and a setting to activate multi-factor authentication processing including a plurality of authentication factors in the authentication of the remote access,
wherein in a case where the multi-factor authentication processing for the local access is activated and the multi-factor authentication processing for the remote access is not activated, the activated multi-factor authentication processing for the local access is controlled not to be deactivated from the authenticated remote access.

2. An image forming apparatus including a function including at least a print function, the image forming apparatus comprising:
one or more processors; and
at least one memory coupled to the one or more processors and storing instructions, which when executed by the one or more processors, cause the image forming apparatus to:
perform authentication processing on local access to the image forming apparatus;
perform authentication processing on remote access to the image forming apparatus; and
receive separately a setting to activate multi-factor authentication processing including a plurality of authentication factors in the authentication of the local access and a setting to activate multi-factor authentication processing including a plurality of authentication factors in the authentication of the remote access,
wherein in a case where the multi-factor authentication processing for the remote access is activated and the multi-factor authentication processing for the local access is not activated, the activated multi-factor authentication processing for the remote access is controlled not to be deactivated from the authenticated local access.

3. The image forming apparatus according to claim 1, wherein one of the plurality of authentication factors supporting the multi-factor authentication in the authentication of the local access is integrated circuit (IC) card authentication using an IC card included in the image forming apparatus, and the plurality of authentication factors supporting the multi-factor authentication in the authentication of the remote access does not include the IC card authentication.

4. The image forming apparatus according to claim 1, wherein authentication based on possession information is set as one of the plurality of authentication factors supporting the multi-factor authentication in the authentication of the local access and in the authentication of the remote access, and software token authentication is set as the authentication based on the possession information in the authentication of the remote access.

5. The image forming apparatus according to claim 4, wherein the image forming apparatus with the software token authentication set as one of the plurality of authentication factors in the authentication of the remote access provides a secret for use by a mobile application of a mobile terminal to issue a software token.

6. The image forming apparatus according to claim 1, wherein in a case where an administrator user having an administrator privilege accesses the image forming apparatus, the image forming apparatus receives the setting to activate the multi-factor authentication processing including the plurality of authentication factors.

7. The image forming apparatus according to claim 1, wherein in a case where a general user locally or remotely accesses the image forming apparatus, the image forming apparatus does not perform the multi-factor authentication, whereas in a case where an administrator user locally or remotely accesses the image forming apparatus, the image forming apparatus performs the multi-factor authentication.

8. The image forming apparatus according to claim 1, wherein a user performing the setting to activate the multi-factor authentication processing is allowed to deactivate the multi-factor authentication processing from the remote access or the local access.

9. A method for controlling an image forming apparatus including a function including at least a print function, the method comprising:

perform, as a first authentication, authentication processing on local access to the image forming apparatus;

performing, as a second authentication, authentication processing on remote access to the image forming apparatus; and receiving separately a setting to activate multi-factor authentication processing including a plurality of authentication factors in the authentication of the local access and a setting to activate multi-factor authentication processing including a plurality of authentication factors in the authentication of the remote access, wherein in a case where the multi-factor authentication processing for the local access is activated and the multi-factor authentication processing for the remote access is not activated, the activated multi-factor authentication processing for the local access is controlled not to be deactivated from the authenticated remote access.

10. A non-transitory computer-readable storage medium storing instructions, which when executed by one or more processors of an image forming apparatus, cause the image forming apparatus to:

perform, as a first authentication, authentication processing on local access to the image forming apparatus;

perform, as a second authentication, authentication processing on remote access to the image forming apparatus; and receive separately a setting to activate multi-factor authentication processing including a plurality of authentication factors in the authentication of the local access and a setting to activate multi-factor authentication processing including a plurality of authentication factors in the authentication of the remote access, wherein in a case where the multi-factor authentication processing for the local access is activated and the multi-factor authentication processing for the remote access is not activated, the activated multi-factor authentication processing for the local access is controlled not to be deactivated from the authenticated remote access.

* * * * *